(12) United States Patent
Das et al.

(10) Patent No.: US 7,730,361 B2
(45) Date of Patent: Jun. 1, 2010

(54) AGGREGATION OF ERROR MESSAGING IN MULTIFUNCTION PCI EXPRESS DEVICES

(75) Inventors: Sumit Sadhan Das, Richardson, TX (US); Roy D. Wojciechowski, Round Rock, TX (US)

(73) Assignee: Texas Instruments Incorporated, Dallas, TX (US)

( * ) Notice: Subject to any disclaimer, the term of this patent is extended or adjusted under 35 U.S.C. 154(b) by 459 days.

(21) Appl. No.: 11/693,781

(22) Filed: Mar. 30, 2007

(65) Prior Publication Data

US 2008/0244146 A1 Oct. 2, 2008

(51) Int. Cl.
*G06F 11/00* (2006.01)
*G06F 11/30* (2006.01)

(52) U.S. Cl. .................... 714/43; 714/33; 714/44; 714/48; 714/57

(58) Field of Classification Search ............ 714/44, 714/48, 56, 33, 43, 57
See application file for complete search history.

(56) References Cited

U.S. PATENT DOCUMENTS

| 7,293,129 | B2 * | 11/2007 | Johnsen et al. ............ 710/313 |
| 2003/0188294 | A1 * | 10/2003 | Balle et al. ................. 717/125 |
| 2004/0204912 | A1 | 10/2004 | Nejedlo et al. |
| 2006/0034326 | A1 | 2/2006 | Anderson et al. |
| 2006/0059213 | A1 * | 3/2006 | Evoy .......................... 708/135 |
| 2006/0288098 | A1 * | 12/2006 | Singh et al. ................. 709/224 |
| 2007/0061634 | A1 | 3/2007 | Marisetty et al. |
| 2007/0083691 | A1 * | 4/2007 | Keely et al. ................. 710/303 |
| 2007/0116025 | A1 * | 5/2007 | Yadlon et al. ............... 370/412 |
| 2008/0005706 | A1 * | 1/2008 | Sharma et al. ................. 716/4 |

* cited by examiner

*Primary Examiner*—Scott T Baderman
*Assistant Examiner*—Joseph Schell
(74) *Attorney, Agent, or Firm*—William B. Kempler; Wade J. Brady, III; Frederick J. Telecky, Jr.

(57) ABSTRACT

A method of aggregating events in a PCIe (Peripheral Component Interconnect Express) multifunction device minimizes reported error messages, where several functions share a common PCIe interface logic. A predetermined number of function entities with logical gates, connected in daisy chain configuration, process incoming information, and a decision is made whether each function entity will generate a blocking control or a pass-through control. The error messages are aggregated across the function entities in a single clock cycle with the help of an error controller. The functions can be from IEEE 1394 interface, graphics display controller, sound card, PCIe switch, or PCIe to PCI bridge connection. Each function preferably has a different configuration and security level setting for error reporting and messaging. There may be a plurality of parallel daisy chains, and the PCIe device may include three layers namely, a physical layer, data link layer and transaction protocol layer (for error logging, reporting).

23 Claims, 6 Drawing Sheets

AGGREGATION OF ERROR MESSAGING IN MULTIFUNCTION PCI EXPRESS DEVICES

FIELD OF THE INVENTION

The present invention relates generally to functioning of PCIe (Peripheral component Interconnect express) devices, and more particularly to controlling of error reporting in multifunction PCIe devices.

BACKGROUND OF THE INVENTION

The rate of innovation in computer technology and more particularly in desktop computers is phenomenal, as known by users of computers. It is also highly visible that software makers create new products and versions to support the latest advances in processing speeds, memory size and hard disk capacity, while hardware vendors release new devices and technologies to keep up with the demands of the latest software. As data acquisition rates increase with advances in silicon technologies, larger amounts of data must be transferred to the PC for processing. These transfers are handled by the data bus connecting the data to the PC memory. However, the rate at which data transfers occur is often the bottleneck in measurements, and is the primary reason that many instruments have incorporated expensive onboard memory.

To address the growing appetite for bandwidth, a new bus technology called PCI Express (known as the PCIe) has been introduced. Originally designed to enable high speed audio and video streaming, PCIe devices are also being used to improve the data rate from measurement devices to PC memory by up to 30 times versus the traditional PCI bus used on older generation desktops.

Developments in PCIe; PCIe was introduced by industry to overcome the limitations of the original PCI bus. Developed and released by Intel® over a decade ago, the original PCI bus operated at 33 MHz and 32 bits with a peak theoretical bandwidth of 132 MB per second. In the implementation of the PCI bus, the bus bandwidth is shared among multiple devices, to enable communication among the different devices on the bus. As devices evolved, new bandwidth hungry devices began starving other devices on the same shared bus. To provide the bandwidth required by these modern devices, PCIe was developed by an industry consortium of PC and peripheral vendors and began shipping in standard desktop PCs. Already, most desktop machines from the leading suppliers include at least one PCIe slot. As known, the most notable PCIe Express advancement over PCI is its point-to-point bus topology. The shared bus used for PCI is replaced with a shared switch, which provides each device its own direct access to the bus. And unlike PCI which divides bandwidth between all devices on the bus, PCIe provides each device with its won dedicated data pipeline. Data is sent serially in packets through pairs of transmit and receive signals called lanes, which enable 250 MBytes/s bandwidth per direction, per lane. Multiple lanes can be grouped together into ×1 ("by-one"), ×2, ×4, ×8, ×12, ×16, and ×32 lane widths to increase bandwidth to the slot.

PCIe dramatically improves data bandwidth compared to legacy buses, minimizing the need for onboard memory and enabling faster data streaming. Notably, because of the sealable lane topology of PCIe, data acquisition vendors can implement a PCI Express connector with the number of lanes suitable to the requirements of the device.

Software compatibility is also ensured by the PCI Express specification. At boot time, generally the operating system can discover all of the PCIe devices present and then allocate system resources such as memory, I/O space, and interrupts to create an optimal system environments. And because the PCIe physical layer is generally transparent to application software, programs originally written for PCI devices can run unchanged on PCIe devices that have the same functionality, and PCI and PCIe devices can be used together in the same system. This retroactive compatibility of PCIe software with traditional PCI is helpful in preserving the software interests of both vendors and users.

Multifunction PCIe devices according to specification will generate unique types of events targetted to the root complex to indicate error conditions through a link. Those events if not dealt with across different functions, will result in a situation where too many events flood the link, thus reducing link bandwidth. It is noted that the specification for a PCExpress multifunction device limits the multifunction device to generating only a limited number of error messages per event. A method is therefore needed to determine which of the functions will be allowed to issue an error message when an event occurs.

SUMMARY OF THE INVENTION

The present invention provides a method of managing a multifunction, PCIe device and using a protocol, such that during error message generation through a link, the number of error messages is limited so that the link is not over burdened, and still the link bandwidth is available. To this end, a daisy chain approach is used for error messaging, with expedient aggregation of messages. In a multifunction PCIe device, the embodiment of the invention as described herein eliminates the need for any special dedicated block of logic by using a daisy chain approach to arbitrate which function will generate the error message. The present approach provides a design which can be easily modified to remove or add functions. The daisy chains are expediently connected from the last function implemented to the new function to add the last function to the error message generation chain. (It should be noted that the daisy chain does not have to connect the functions in numerical order.) To remove a function from the design, the daisy chain-inputs to the removed function need to be connected to the function which is being fed by the removed function.

The invention in one form resides in a method of aggregating events of various types to minimize number of error messages in a PCIe (Peripheral component Interconnect Express) multifunction device which processes information where functioning-errors resulting in events reportable as error messages through a link can occur, where several functions share a common PCIe interface logic and where the PCIe device has a specification limiting how many error messages can be generated, comprising the steps of: using a predetermined number of function entities serially connected in a daisy chain configuration, each function entity comprising logic gates; passing said information serially through function entities in each daisy chain, and based on the logic gates deciding whether each function entity will generate a blocking control or a pass-through control; and, aggregating error messaging across the function entities to limit the number of error messages.

The invention in a second form resides in a method of managing events of various types to minimize number of error messages in a PCIe (Peripheral component Interconnect Express) multifunction device which processes information where functioning-errors resulting in events reportable as error messages through a link can occur, where several functions share a common PCIe interface logic and where the PCIe device has a specification limiting how many error messages can be generated, the method comprising the steps of: using a predetermined number of function entities serially connected in a daisy chain configuration, each function entity comprising logic gates; passing the information serially through function entities in each daisy chain, and based on the logic gates deciding whether each function entity will generate a blocking control or a pass-through control; and, aggregating error messaging across said function entities to limit the number of error messages, wherein the step of aggregating error messaging is done in a single clock cycle with the help of an error controller, wherein each function of the PCIe device has a different configuration and security level setting for error reporting and messaging, including the step of using a plurality of daisy chains in parallel, wherein the PCIe device includes three layers namely, a physical layer, data link layer and transaction protocol layer, in which layers an error can occur, the method including using a single clock cycle to arbitrate the error event.

The invention also encompasses a computer readable medium encoded with data/instruction which when executed by a computing platform results in execution of a method as recited above.

It is noted that the term "message" is abbreviated herein for convenience in some instances as "msg".

As described in connection with an embodiment, three daisy chains will be deployed to evaluate the error condition in parallel. According to the device configuration control, the three daisy chains will evaluate a given event and potentially will generate, by aggregation, a maximum of three messages of three different types [error fatal msg, error non fatal msg, error correctable msg]. This aggregation logic will limit any particular type of error msg to be generated, to just one or none.

BRIEF DESCRIPTION OF THE DRAWING

A more detailed understanding of the invention may be had from the following description of certain embodiments, given by way of example and to be understood in conjunction with the accompanying drawing wherein.

DETAILED DESCRIPTION

Figure 1:
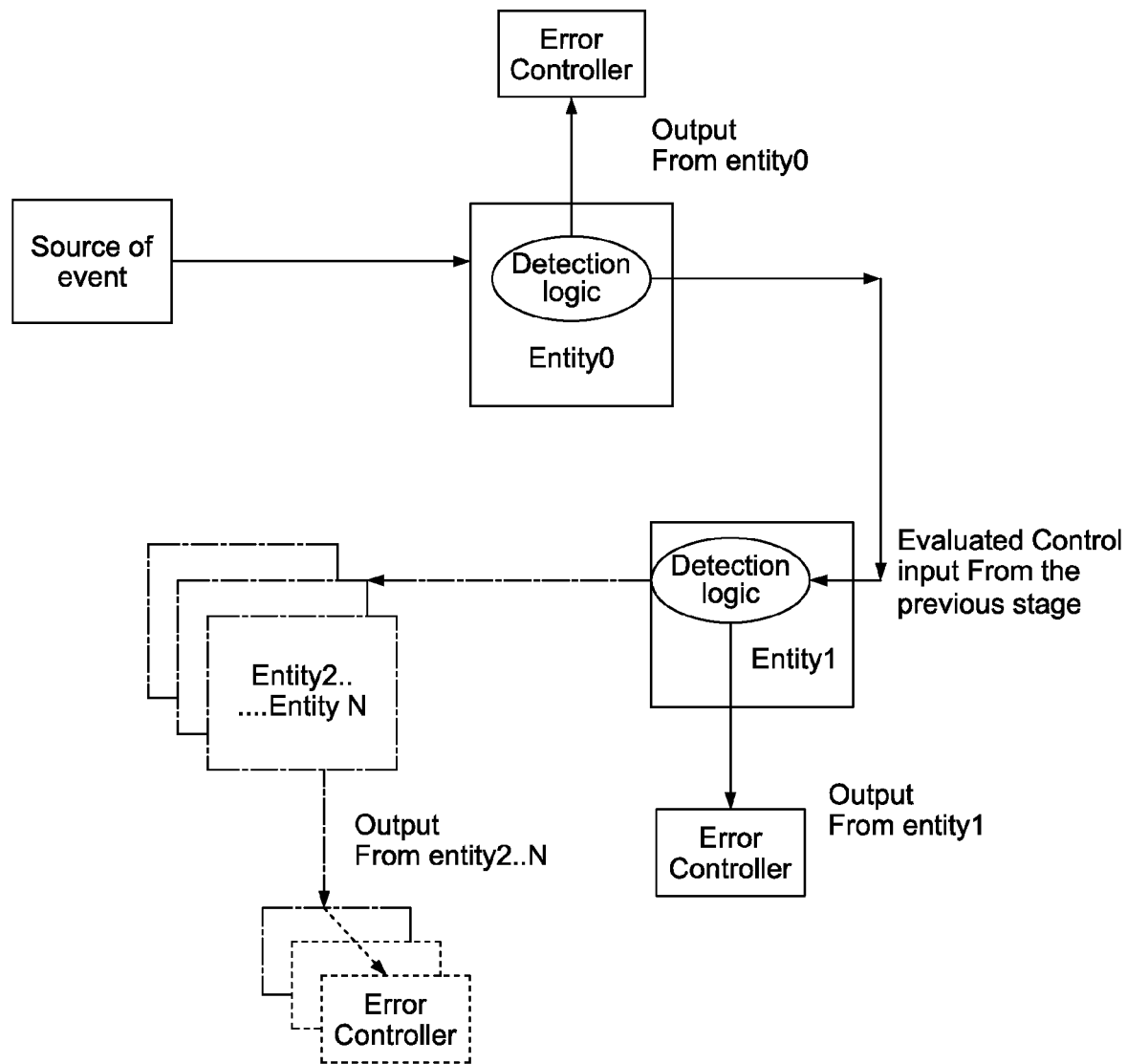
FIG. 1 is an exemplary illustration of a daisy chain as used herein to aggregate events across various entities.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

The invention eliminates the need for any special dedicated block of logic to arbitrate as to which function will generate the error message. The invention allows a design to be easily modified to remove or add functions. An exemplary manner of using the daisy chain approach for aggregating events which potentially generate error messages is described below with specific reference to the FIGs. referenced hereinabove. It is noted that the daisy chains do not have to connect the functions in ay particular order.

A function in a PCI or PCIe device is generally an independent entity that can be controlled and configured by software. Each function has its own configuration, memory, and IO address spaces separate from all other functions in the system. A function can be (but not limited to) an IEEE 1394 interface, graphics display controller, sound card, PCIe switch, PCIe to PCI bridge. A PCIe device may have one to seven functions. Each function is independent to the other functions, and there are virtually no interactions between the functions.

One exception to the plurality of functions of the regular PCIe device being independent of each other is the PCIe multifunction device, which is the subject of the present approach. In the PCIe multifunction device, the functions are shared on one PCIe interface. An error that is reported on the shared interface is reported to all of the functions that share the interface. The PCIe base specification requires that at most one of the functions should generate an error message for each possible error class. Described herein is a method by which the functions interact with each other to determine which of the functions (if any) will generate an error message when an error has been detected in the shared interface logic. Also, in the context of the present invention, a function entity is a single instance of a function in the PCIe device, which as described herein may handle up to seven functional entities.

The design described herein by way of example uses the daisy chain approach in the process of multifunction error messaging in the context of multifunction PCI express devices which are also known as PCIe devices. PCIe devices with multiple functions are managed as described herein to aggregate events of various types. This daisy chain technique passes the necessary information through each function entity of the device in a block. Each function according to its configuration state decides whether it will forward a blocking-control or a pass-through control to the next function entity connected in the chain. In the case of a blocking control, the function entities connected downstream in the chain will not react to the forwarded event. In the case of pass-through control however, the next function entity on the chain will go through the same decision tree according to its own confirmation states. In the same way, information will be passed along through N (number of function entities) entities of the daisy chain, and all the decisions will be made in a single cycle without need for too much additional logic. Also, all the processing in each block happens locally in phases, and, at the last phase it gets gated with the previous function entity's decision. This technique is used herein in multifunction PCIe devices to aggregate error messaging across various functions. Each function of the PCIe device can have a different configuration and severity-level set for error reporting and messaging. The present approach uses an error controller which coordinates all these functions in a daisy chain fashion performs aggregation where, in every function, the boundary decision gets evaluated with the previously evaluated decision of the function connected in the chain prior to the decision making point. If the previously evaluated result is true, then it will block all other evaluated results in the chain for any subsequent functions of any messages of the same kind. Expediently, for different messages there are separate chains. Aggregation of the messages across various functions in the present approach provides better utilization of the link bandwidth. The approach described herein provides a solution to evaluate multifunction error messaging in a single cycle and uses minimal gates and a minimal level of logic. Since the connections are serial through the functions, the logic in each function is not impacted by the total number of functions on the device. This makes the definition of a function as an IP block much easier.

As illustrated, three daisy chains and a device configuration control are deployed to evaluate the error condition of each event. As guided by the device configuration control, the three daisy chains will evaluate the event and potentially will generate maximum of three messages of three different types [error fatal msg, error non fatal msg, error correctable msg]. This aggregation logic, will limit any particular type of error message to be generated, to at most a single message.

PCIe protocol as explained herein provides a guideline for different error scenarios. It addresses how those error scenarios need to be handled and how multifunction PCIe device needs to react to provide a feedback and recover from various error types and how at the end of error detection, the device reports and logs those errors. PCIe errors can consist of physical layer errors, data link layer errors and transaction layer errors in the packet. Whenever any error occurs, whether it is in the physical layer or data link layer or transaction layer error according to the configuration of the device, the error message needs to be sent to the root complex of the PCIe fabric. But PCIe fabric restricts the receiving device from generating numerous or limitless messages for a single event. In case of multifunction devices for a given error that occurs in the physical link/data link layer/transaction layers [as it is shared by multiple functions] there can be at most one error message transmitting through the link. The present approach describes a unique way of aggregating the error event information across any number of functions and make sure only one or no error message comes out of the link for that given error.

FIG. 1 is exemplary an illustration of a daisy chain to aggregate events across various entities and shows the source of event, and entities from 0, 1 to N number of entities which are serially connected in a daisy chain fashion. Each entity sends an output to an error controller, which cooperates with the function entities and assists in the function of aggregating error messages.

Figure 2:
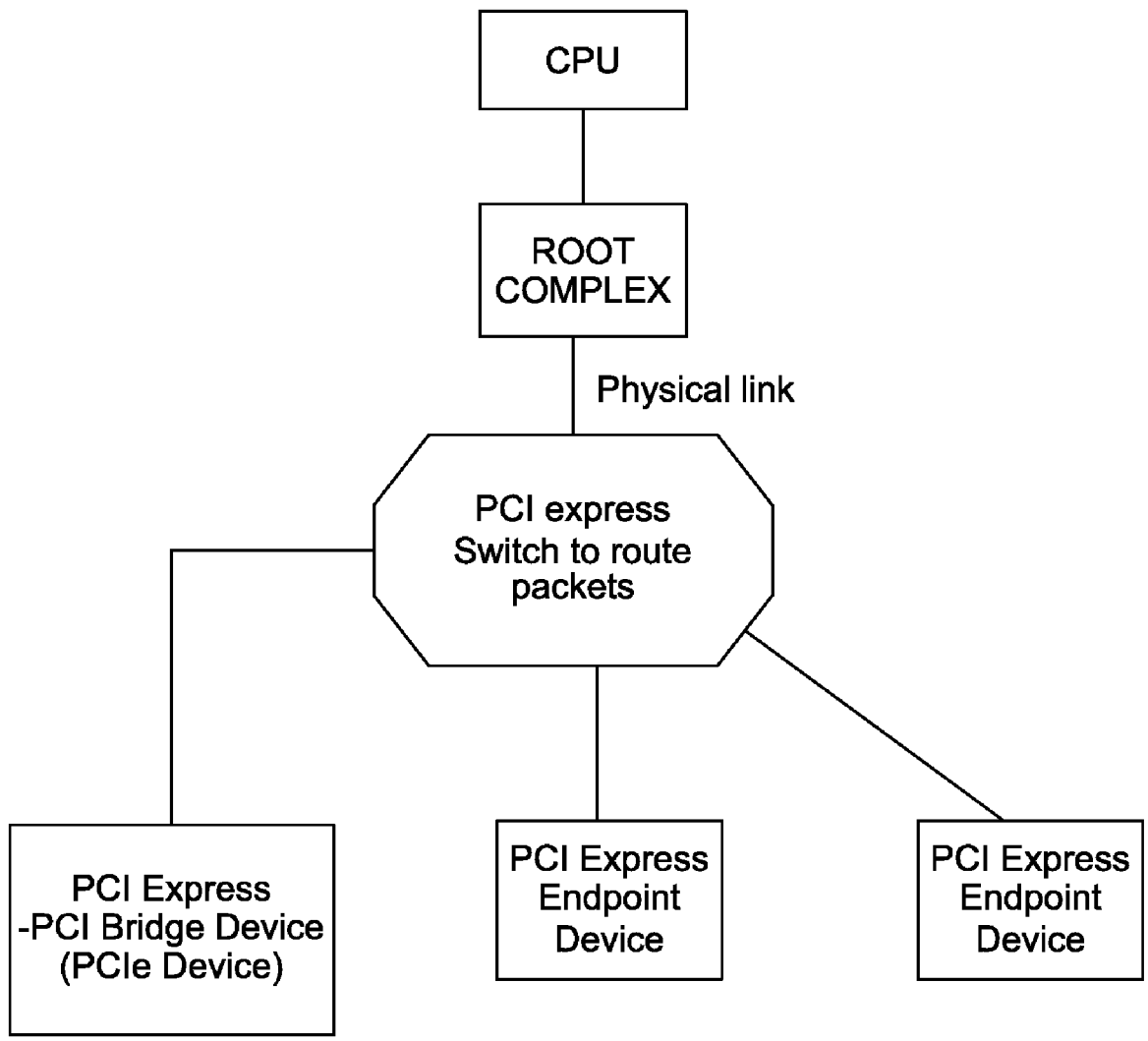
FIG. 2 shows the exemplary illustration of a functional entity, including a root complex and physical link.

FIG. 2 is an exemplary illustration of a functional entity showing interaction with a root complex and physical link including a root complex. FIG. 2 also shows the interconnection among a PCI express switch to route packets, and a PCI bridge device, as well as a plurality of PCIe endpoint devices.

Figure 3:
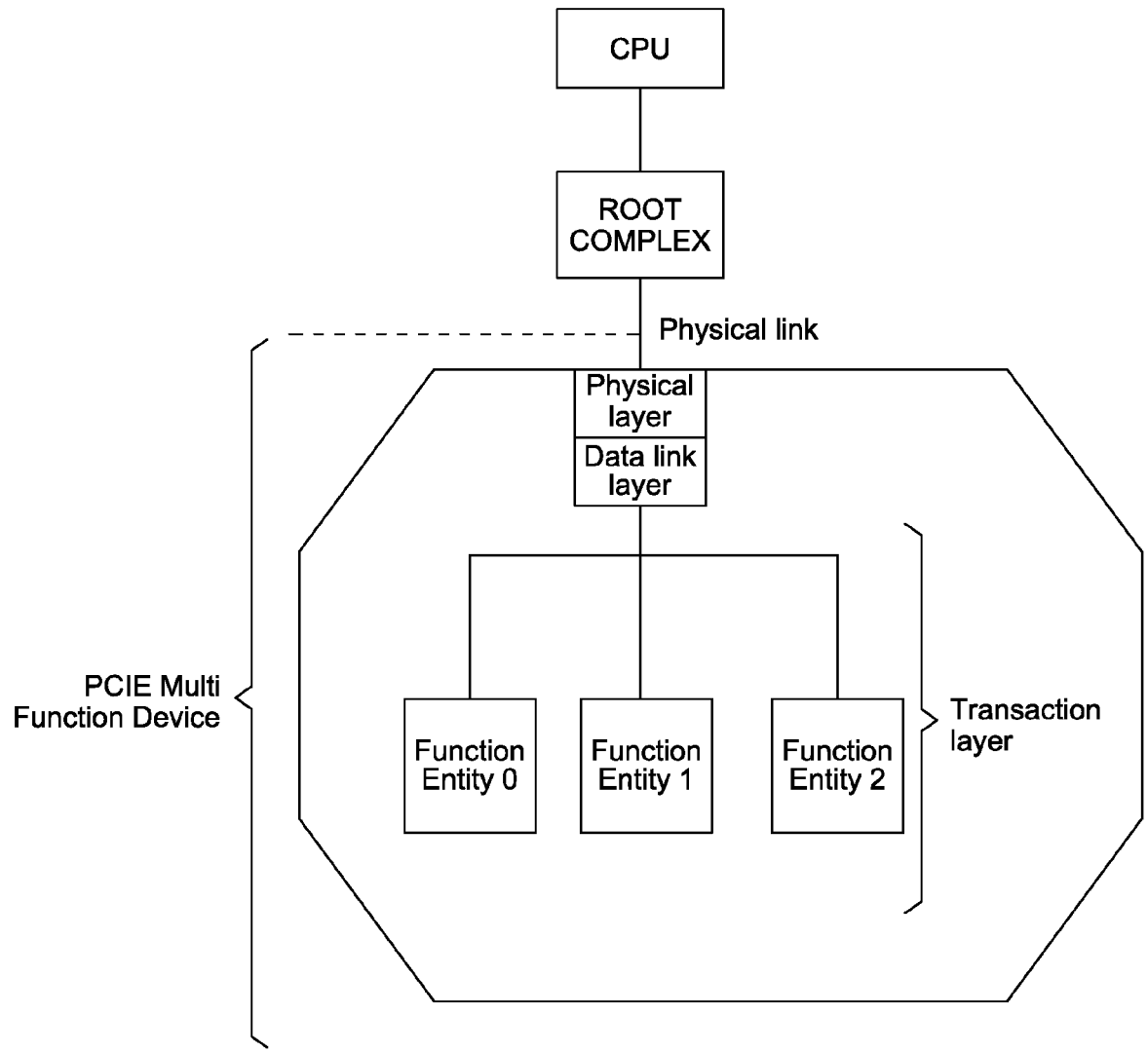
FIG. 3 is an exemplary illustration of a functional entity, inside a multifunction PCIe device showing a transaction layer.

FIG. 3 is an illustration of a functional entity and the architecture inside a multifunction PCIe device, showing the transaction layer. The transaction layer includes function entities 0, 1 and 2, which include logic gates. Functionally, error logging and reporting logic is housed in the transaction protocol layer.

Figure 4:
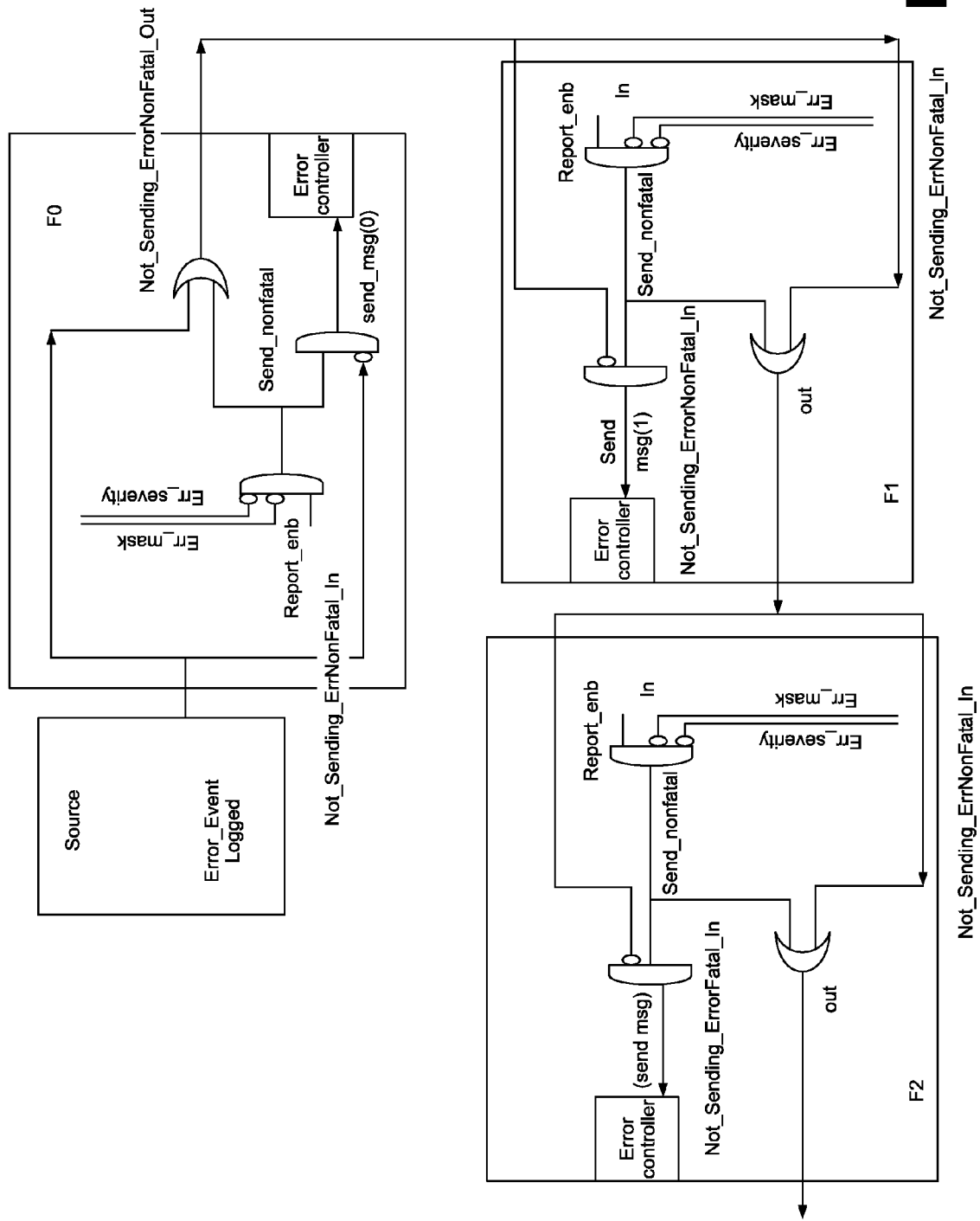
FIG. 4 is an illustration of a transaction layer in a PCIe non-fatal error messaging aggregation chain.
Figure 5:
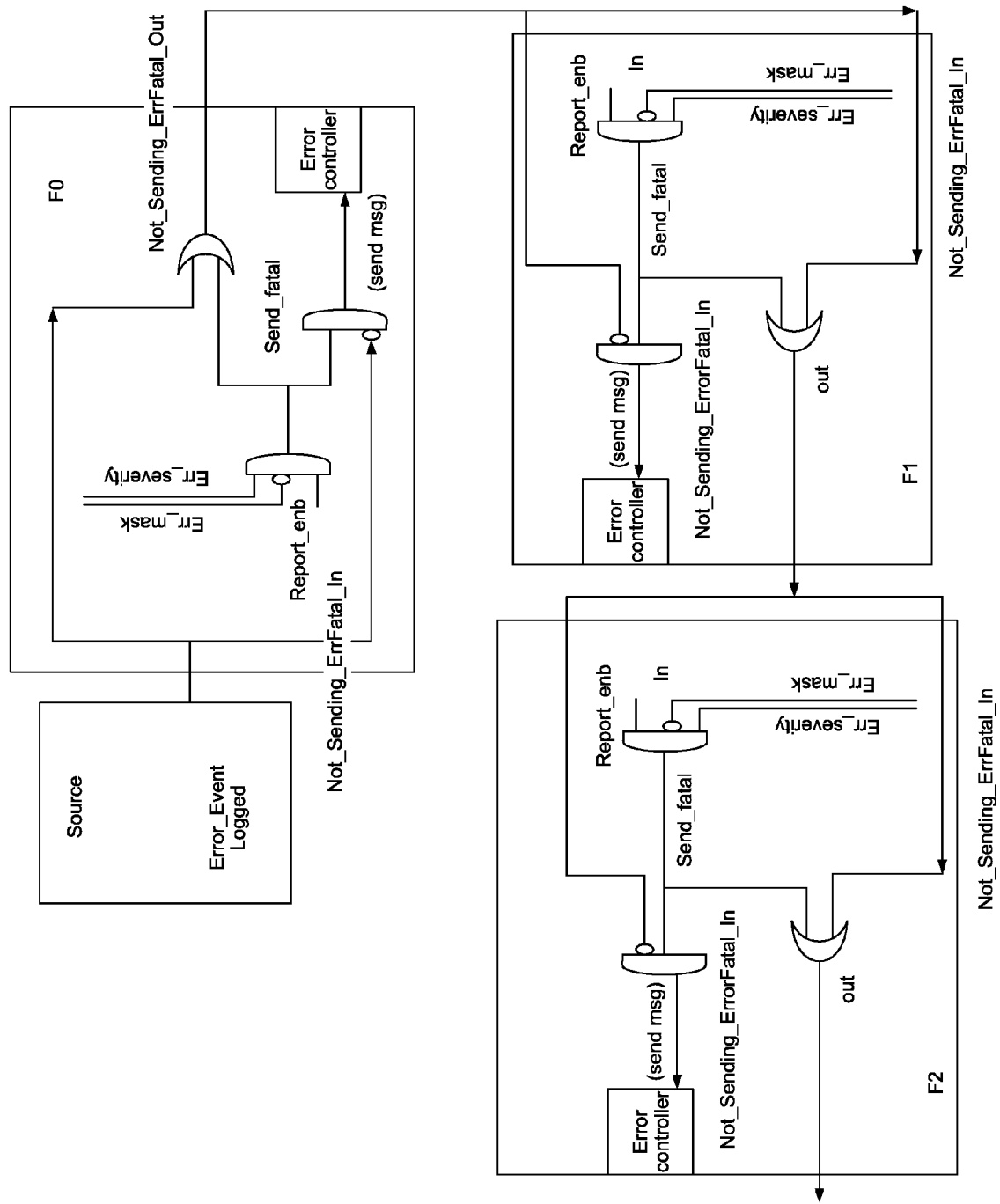
FIG. 5 is an illustration of a transaction layer in a PCIe fatal error messaging aggregation chain; and, FIG. 6 is an illustration of a transaction layer in a PCIe correctable error messaging aggregation chain.
Figure 6:
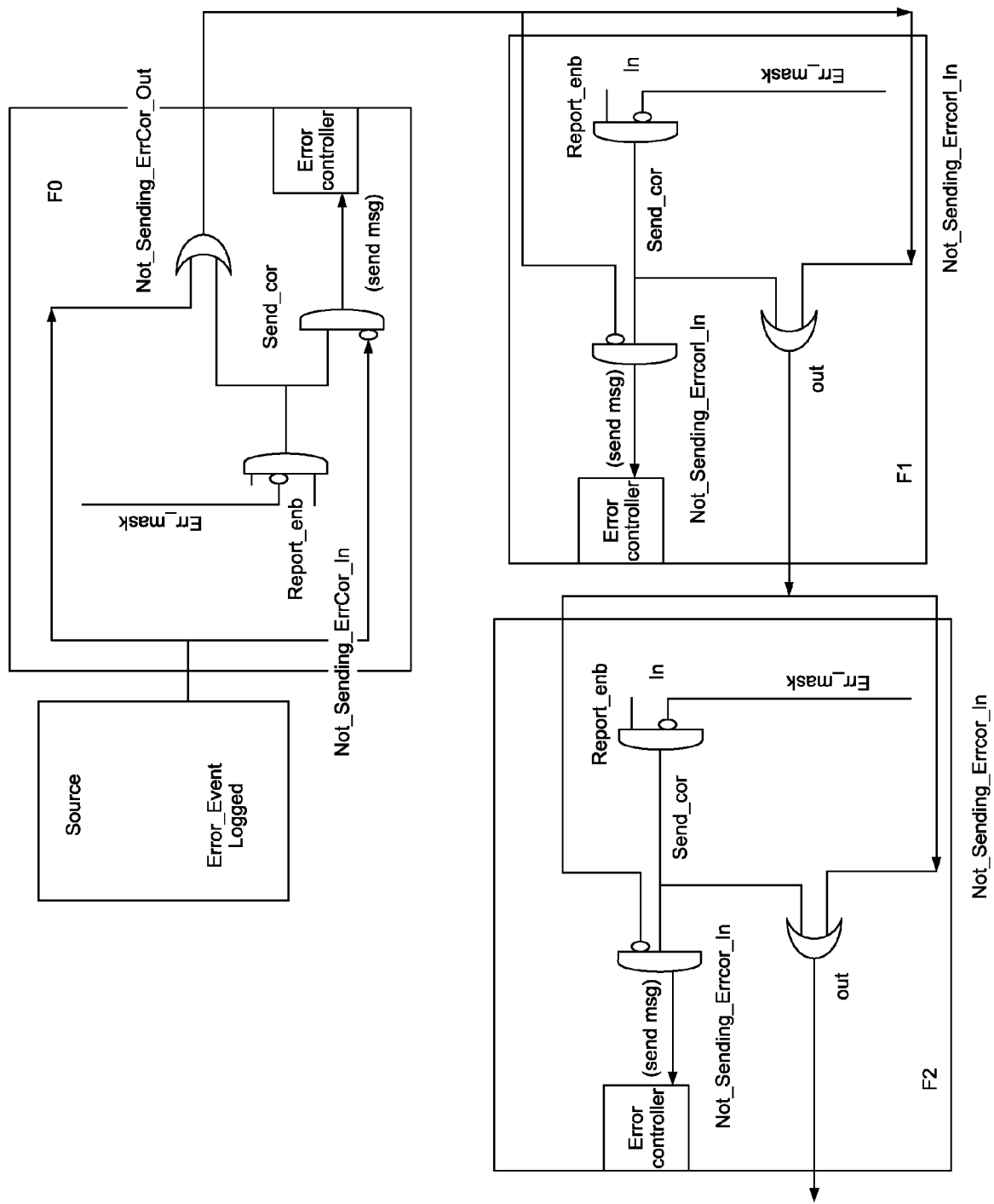

As described herein, there can be three different types of error message, as particularly illustrated in FIGS. 4, 5 and 6.

The error message according to the error type include error-fatal, error-nonfatal and error-correctable messages. The daisy chain mechanism used herein as stated supra, assists in achieving the aggregation of the messaging for all three different types of error messages. The error event is passed along serially from the source to the first function and then to the next function and so on as specifically illustrated in FIG. 1. The error event gets gated by various configuration controls of the particular function and produces either a claimed-signal or a not claimed-signal which passed to the next functional entity in the chain. If the error event is already claimed by entity 0 then subsequent entities in the chain will get blocked from claiming the event, and thus also get blocked from generating a message. In that case, only entity 0 will generate the message whereby aggregation of error messaging is achieved. On the other hand, if functional entity 0 does not claim the error event because the device configuration of the functional entity 0 is not enabled, then, the next functional entity will get a chance to evaluate the error event, when, the gating control will decide whether entity 1 claims the event. Thus only one entity will claim the control for any given type of error message and that will ensure the aggregation of all messages. The foregoing process is illustrated for three types of messages as identified above, with particular reference to FIGS. 4, 5 and 6. It is noted that each entity F0, F1 and F2 generates a "send msg" signal to the error controller which assists in aggregation of error events.

The foregoing aggregation logic evaluates the message generation control across any number of functions in a single clock cycle, whereby the described approach ensures atomic effect of the error event across various functions and thus maintains error reporting efficiency. This approach uses minimal number of logic gates and thus provides a unique and efficient way error message aggregation.

With specific reference to the illustration in FIG. 3, when the CPU and root complex are powered up, then the root complex as shown will exchange various handshake packets with the physical layer and data link layer of the PCIe device. After the physical layer is up and root complex has recognized the existence of the device connected in the link, the root complex will send various information packets during boot up process to put the device in different states. Examples of the information packets might relate to the memory map, the memory map and the bus number.

PCIe fabric in the context of the present invention includes at least two interacting PCIe devices, and consists of a root complex as illustrated in FIG. 3, and includes switch matrix, endpoint device, for instance. Also, in the context of the present invention, a single event is an error is detected. The detected error causes error information to be saved and possibly error messages(s) to be generated by the functions in the device. With further reference to the illustration in FIG. 3, the layers in a PCIe function, starting from the bottom are physical layer, data link layer, and transaction protocol layer. An error can be detected in all of the three layers, but all of the error logging and reporting logic will expediently be in the transaction protocol layer.

With further reference to the illustration in FIGS. 4, 5 and 6 which comprise logic gates, each FIG. shows the source, and three functions F0, F1 and F2 which are serially connected, and any one of the three functions F0, F1 and F2 can "claim" and generate an error message to the exclusion of the other two functions, as described below in further detail. When an error event has occurred, it passes through thee daisy chains. If the error event starts from function F0, the very first control logic which belongs to the function F0 will act upon the error event. Once various logic gates in F0 evaluate the control to be logical, then the error event will be "claimed" by the function F0 and it will generate the message. However, if the logic results in logic 0, then the error event will be available to the function F1 for evaluation, using the same decision making process as in F0. By the use of the daisy chain in the present approach, only one function can generate the error message associated with the error report being arbitrated. A function that 'claims' the error will be generating the error message. The claim will occur when two conditions are met:
1) The function is enabled to generate the error message and
2) No function earlier in the daisy chain has claimed the error for reporting.

The description herein uses the terms "clock cycle" and "arbitration". In the context of the present description, a single clock cycle is reckoned from an asserting edge of the clock (usually rising) to the next asserting edge of the clock. The arbitration is atomic in that the all the decisions are made in one clock cycle, which reduces the potential for the design to have an error resulting in no error message generated (when one is expected) or more than one error message being generated. Being atomic also removes the complications associated with having to arbitrate errors on two consecutive clock cycles. On the first asserting edge of the clock cycle, the error arbitration request is asserted on the beginning of the daisy chain. On the next asserting edge of the clock, each of the functions will have determined it will respond to the error reporting request.

Equations relevant to the present method in the context of FIGS. 4, 5 and 6:

(The term "message" is abbreviated as "msg" herein)
1. Not_sending_error_nonfatal_out=if Error Event is true then not_sending_error_nonfatal_in or send_nonfatal msg.
2. For function entity zero not_sending_error_nonfatal_in=Logic0.
3. Send_nonfatal=reprot enable and Error_mask_bar and error_severity_bar Send_msg(0)=not_sending_ErrorNonfatal_in_bar and send_nonfatal.
4. Not_sending_ErrorNonfatal_in_bar=not_sending_ ErrorNonfatal_in Error_mask_bar=not error_mask Error_severity_bar=not error_severity.
5. For function entity one: not_sending_error_nonfatal_in=not_sending_error_nonfatal_out [from entity zero]
6. Send_nonfatal=report enable and Error_mask_bar and error_severity_bar Send_msg(1)=not_sending_ErrorNonfatal_in_bar and send_nonfatal not_sending_ ErrorNonfatal_in_bar=not_sending_ErrorNonfatal_in
7. If send_msg(0)=Logical then send_msg(1)=Logic0, thus only function zero entity will generate the msg and thus the aggregation of msg for particular type will be achieved across any number of functions.

At least some advantages of the present solution include the following:
a) The logic in the present approach is optimized from the view point of area requirement. The logic also assists in preventing the error reporting link from being overburdened and blocked, owing to the decision trees being kept parallel, whereby timing is less critical.
b) All the decisions are taken in a single clock cycle.
c) Since the connections are serial through the functions, the logic in each function is not impacted by the total number of functions on the PCIe device. This enables making the definition of a function as an IP block easier.
d) The present approach requires the use of a minimal number of logic gates and still provides a unique and efficient manner of error message aggregation.

The present invention includes a computer readable medium encoded with software data/instruction which when executed by a computing platform would result in execution of a method as described and claimed herein. Different embodiments of the present subject matter can be implemented in software which can be used in any suitable computing environment. The embodiments of the present subject matter are also operable in a number of general-purpose or special-purpose computing environments, or processors or processing units. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium or computer memory elements. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as referred to hereinabove, includes any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

In the foregoing detailed description of embodiments of the invention, various features are grouped together in a single exemplary embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims.

Many other embodiments will be apparent to those of skill in the art upon reviewing the description above. The scope of the invention should therefore be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., where used are merely labels, and are not intended to impose numerical requirements on their objects.

The invention claimed is:

1. In a PCIe (Peripheral Component Interconnect Express) multifunction device which processes information where functioning-errors resulting in events reportable as error messages through a link can occur, where several functions share a common PCIe interface logic and where the PCIe device has a specification limiting how many error messages can be generated, a method of aggregating events of various types to minimize number of error messages, comprising:
 using a predetermined number of function entities serially connected in a daisy chain configuration, each said function entity comprising logic gates;
 passing said information serially through function entities in each daisy chain, and based on said logic gates deciding whether each function entity will generate a blocking control or a pass-through control; and
 aggregating error messaging across said function entities to limit said number of error messages, wherein said predetermined number of function entities can be up to seven, and wherein aggregating error messaging is done in a single clock cycle by using an error controller.

2. The method of aggregating events as in claim 1 wherein each function of said PCIe device has a different configuration and security level setting for error reporting and messaging.

3. The method of aggregating events as in claim 1 comprising using a plurality of daisy chains in parallel.

4. The method of aggregating events as in claim 1 wherein the PCIe device includes three layers: a physical layer, data link layer and transaction protocol layer, in which layers an error can occur, the method including using a single clock cycle to detect an event.

5. The method of aggregating events as in claim 1 wherein a function entity that claims an error will generate an error message, and wherein claiming happens when a function generates an error message, and no function which is situated earlier in its daisy chain has claimed the error message for reporting.

6. The method of aggregating events as in claim 1 wherein the PCIe includes a transaction protocol layer, the method including the step of using said transaction protocol layer for error logging and reporting logic.

7. The method of aggregating events as in claim 1 comprising using three daisy chains.

8. The method of aggregating events as in claim 1 wherein passing said information serially through function entites includes passing an error event which has occurred, through function 0, to function 1, on to function 2.

9. The method of aggregating events as in claim 1 wherein the PCIe device includes a root complex component, a switch matrix and an end point element/device.

10. A computer readable medium encoded with data/instruction which when executed by a computing platform results in execution of a method as in claim 1.

11. A method of aggregating events of various types to minimize number of error messages in a PCIe (Peripheral Component Interconnect Express) multifunction device which processes information where functioning-errors resulting in event reportable as error messages through a link can occur, where several functions share a common PCIe interface logic and where the PCIe device has a specification limiting how many error messages can be generated, the method comprising:
 using a predetermined number of function entities serially connected in a daisy chain configuration, each said function entity comprising logic gates;
 passing said information serially through function entities in each daisy chain, and based on said logic gates deciding whether each function entity will generate a blocking control or a pass-through control; and
 aggregating error messaging across said function entities to limit said number of error messages, wherein the step of aggregating error messaging is done in a single clock cycle by using an error controller.

12. The method of aggregating events as in claim 11 wherein said predetermined number of function entities is up to seven, and wherein a function can be IEEE 1394 interface, graphics display controller, sound card, PCIe switch, or PCIe to PCI bridge connection.

13. The method of aggregating events as in claim 11 wherein each function of said PCIe device has a different configuration and security level setting for error reporting and messaging.

14. The method of aggregating events as in claim 11 comprising using a plurality of daisy chains in parallel.

15. The method of aggregating events as in claim 11 wherein the PCIe device includes three layers namely, a physical layer, data link layer and transaction protocol layer, in which layers an error can occur, the method including using a single clock cycle to detect an event.

16. The method of aggregating events as in claim 11 wherein a function entity that claims an error will generate an error message, and wherein claiming happens when a function generates an error message, and no function which is situated earlier in its daisy chain has claimed the error message for reporting.

17. The method of aggregating events as in claim 11 wherein the PCIe includes a transaction protocol layer, and using said transaction protocol layer for error logging and reporting logic.

18. The method of aggregating events as in claim 11 comprising using three daisy chains.

19. The method of aggregating events as in claim 11 wherein passing said information serially through function entities includes passing an error event which has occurred, through function 0, to function 1, on to function 2.

20. The method of aggregating events as in claim 11 wherein the PCIe device includes a root complex component, a switch matrix and an end point element/device.

21. A computer readable medium encoded with data/instruction which when executed by a computing platform results in execution of a method as in claim 11.

22. A method of managing events of various types to minimize number of error messages in a PCIe (Peripheral Component Interconnect Express) multifunction device which processes information where functioning-errors resulting in events reportable as error messages through a link can occur, where several functions share a common PCIe interface logic and where the PCIe device has a specification limiting how many error messages can be generated, the method comprising:

using a predetermined number of function entities serially connected in a daisy chain configuration, each said function entity comprising logic gates;

passing said information serially through function entities in each daisy chain and based on said logic gates and deciding whether each function entity will generate a blocking control or a pass-through control; and aggregating error messaging across said function entities to limit said number of error messages, wherein aggregating error messaging is done in a single clock cycle by using an error controller, wherein each function of said PCIe device has a different configuration and security level setting for error reporting and messaging, including using a plurality of daisy chains in parallel, wherein the PCIe device includes three layers : a physical layer, data link layer and transaction protocol layer, in which layers an error can occur, the method including using a single clock cycle to detect an event.

23. A PCIe (Peripheral Component Interconnect Express) multifunction device which processes information where functioning-errors resulting in events reportable as error messages through a link can occur, where several functions share a common PCIe interface logic and where the PCIe device has a specification limiting how many error messages can be generated, comprising:

means for using a predetermined number of function entities serially connected in a daisy chain configuration, each said function entity comprising logic gates;

means for passing said information serially through function entities in each daisy chain, and based on said logic gates deciding whether each function entity will generate a blocking control or a pass-through control; and means for aggregating error messaging across said function entities to limit said number of error messages wherein said predetermined number of function entities can be up to seven, and wherein the aggregating error messaging is done in a single clock cycle by using an error controller.

* * * * *